March 19, 1957 — E. ALDEBORGH ET AL — 2,785,471
EXTERNAL AND INTERNAL CALIPER GAGE
Filed Aug. 6, 1954 — 2 Sheets-Sheet 1
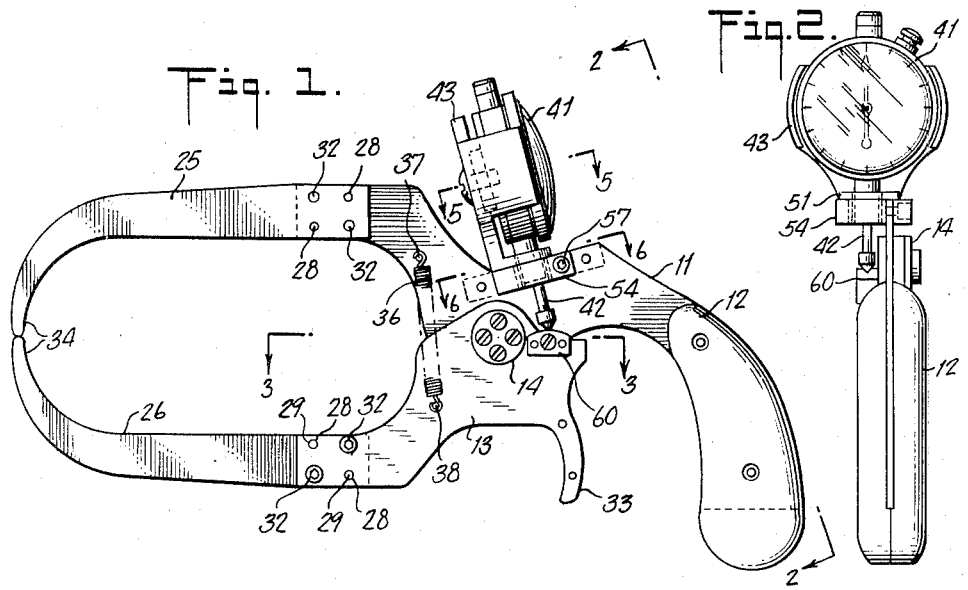
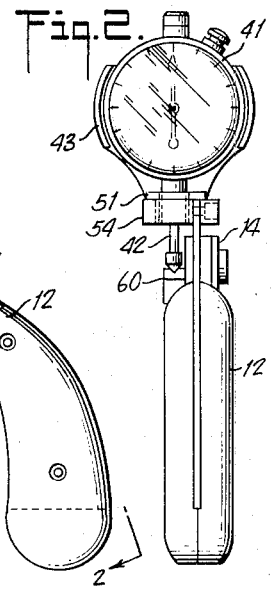
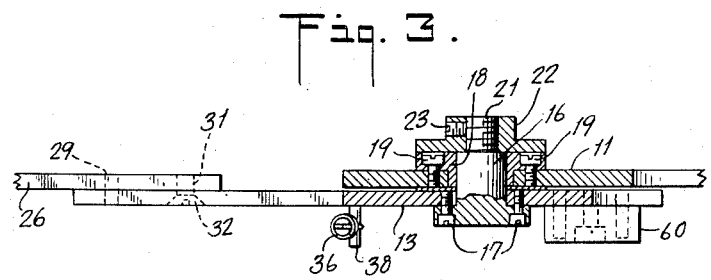
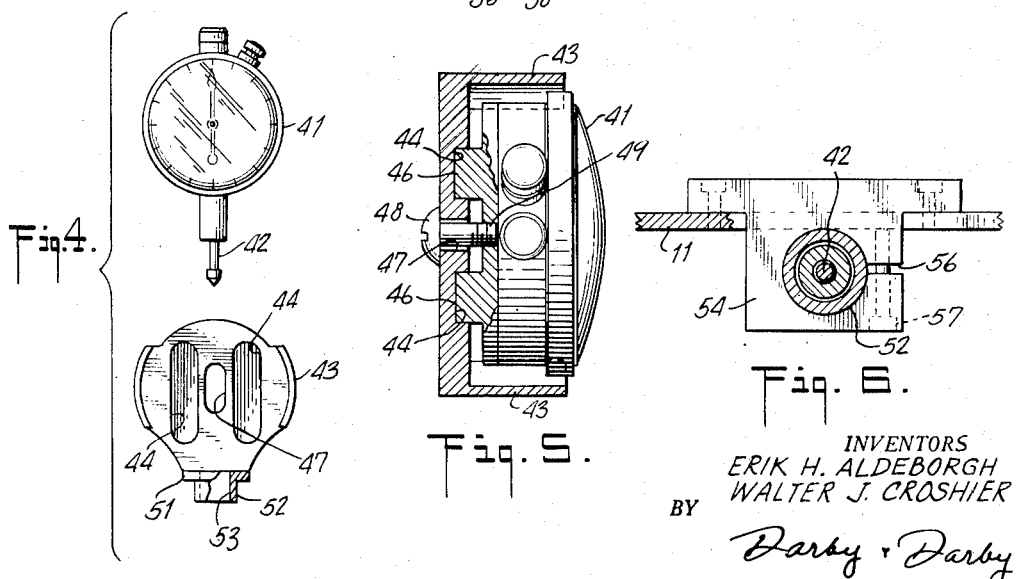
INVENTORS
ERIK H. ALDEBORGH
WALTER J. CROSHIER
BY Darby & Darby
ATTORNEYS March 19, 1957 E. ALDEBORGH ET AL 2,785,471
EXTERNAL AND INTERNAL CALIPER GAGE
Filed Aug. 6, 1954 2 Sheets-Sheet 2
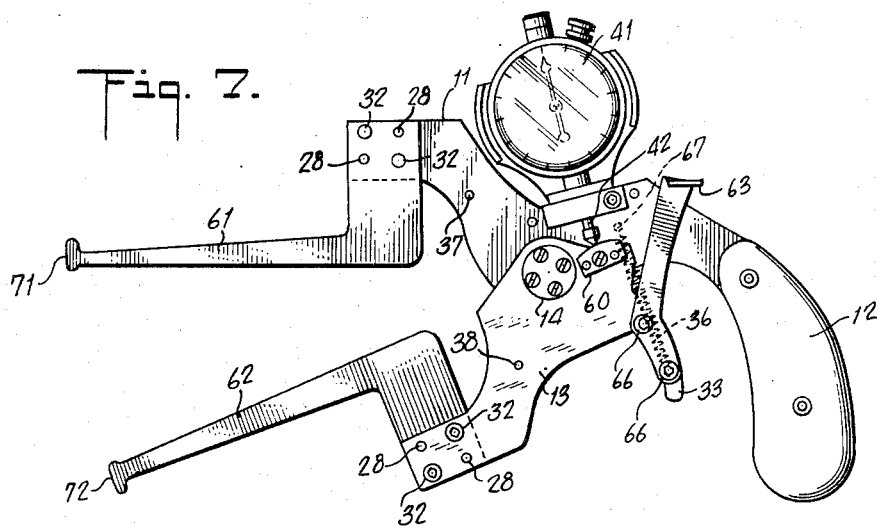
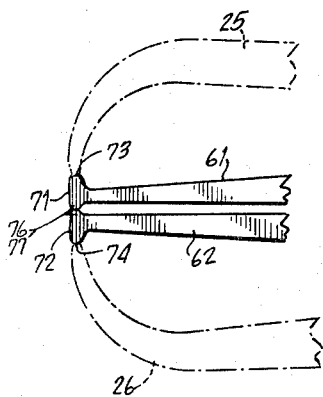
INVENTORS
ERIK H. ALDEBORGH
BY WALTER J. CROSHIER
Darby & Darby
ATTORNEYS

United States Patent Office 2,785,471
Patented Mar. 19, 1957

2,785,471

EXTERNAL AND INTERNAL CALIPER GAGE

Erik Aldeborgh, Poughkeepsie, and Walter J. Croshier, Hyde Park, N. Y., assignors to Standard Gage Company, Inc., Poughkeepsie, N. Y., a corporation of New York Application August 6, 1954, Serial No. 448,260

2 Claims. (Cl. 33—148)

The present invention relates to direct-reading measuring gages and is more particularly concerned with caliper-type gages for both internal and external measurements.

In many industrial applications, it is necessary to accurately measure dimensions of articles or devices of various forms and configurations and many types of gages have been devised for those purposes. Among such types have been caliper gages having a pair of arms terminating in tips which may be juxtaposed to the desired portions of the items being measured. Indicators are then provided for determining to a desired degree of accuracy the separation of the caliper arm tips, which thereby indicates the measurement desired. In such cases, it is highly desirable to provide a simple, readily usable and relatively inexpensive gage which can provide a direct reading of the separation of the caliper arm tips and thereby indicate directly the measurements as they are made. It is also desirable to provide for both internal and external measurements, which normally require different shapes of caliper arms for ready use.

It is an object of the present invention to provide an improved and simplified form of direct-reading gage readily convertible from internal to external measurements without the necessity of recalibration.

It is also an object of the present invention to provide such a gage with a practical accuracy of the order of one-thousandth to ten one-thousandths of an inch, which can be readily adjusted by the user for most convenient direct reading functioning.

It is an additional object of the present invention to provide such gages with means for readily setting the zero or calibrating the reading thereto.

Other objects and advantages of the present invention will become more fully apparent from the following description of a preferred form thereof taken in conjunction with the appended drawings in which Fig. 1 is a side elevational view of a caliper gage according to the present invention, for external measurement;

Fig. 2 is an elevational view of the device of Fig. 1 viewed along line 2—2 thereof;

Fig. 3 is a fragmentary cross-sectional plan view of the device of Fig. 1, taken along the line 3—3 thereof and showing the pivot or fulcrum arrangement;

Fig. 4 is a fragmentary exploded elevation view of the indicator and bracket of the device of Fig. 1;

Fig. 5 is a fragmentary cross-sectional plan view of the indicator body and bracket viewed along line 5—5 of Fig. 1;

Fig. 6 is a fragmentary cross-sectional plan view of the indicator rotatable adjustment viewed along line 6—6 of Fig. 1;

Fig. 7 is an elevational plan view of the device of Fig. 1 for use in internal caliper measurements and with the indicator thereof turned 90°; and Fig. 8 is a diagrammatic showing indicating the relationship between the external and internal caliper arms.

Referring to the drawings, and especially Figs. 1–6, there is shown a frame member 11 having a suitable handle 12 illustrated as in the form of a pistol grip for manually holding the instrument of the invention. Pivotably related to the frame 11 is a second frame member 13, the pivot fulcrum 14 being shown in cross-section in Fig. 3 as comprising a shaft 16 having an enlarged head secured to the movable frame member 13 as by screws 17, shaft 16 rotatably engaging a sleeve bearing member 18 secured as by screws 19 to the frame member 11. To prevent lateral movement of the two frame members 11 and 13 along the pivot axis, the shaft 16 is terminated in a threaded portion 21 engaging an internally threaded nut or collar 22 secured to the threaded shaft portion 21 as by a set screw 23. In this way, frame members 11 and 13 may pivot relative to one another about the axis of shaft 16.

Removably secured to each of the frame members 11 and 13 is a respective caliper jaw or arm 25, 26, each having a pair of holes 28 cooperating with locating pins 29 secured to the frame member, and a pair of threaded holes 31 cooperating with a screw or like fastener 32 passing through the frame member and serving to clamp the caliper arm 26 to the frame member 13 and similarly the caliper arm 25 to the frame member 11. A tension spring 36 at one end passes about a pin 37 secured to the frame 11 and at the other end about a pin 38 secured to the frame member 13, and thereby serves to urge the caliper arm tips 34 together. Frame member 13 is provided with an extension similar to a trigger 33 so that the operator's finger while holding the pistol grip 12 may by pulling upon the trigger 33 separate the tips 34 of the caliper arms 25, 26.

A conventional dial indicator 41 having an axially movable spindle 42 is mounted on a bracket and guard 43. As shown in Figs. 4 and 5, guard 43 has a pair of grooves 44 which cooperate with lands 46 on the casing of the indicator 41 to assure only longitudinal movement thereof relative to bracket 43. Bracket 43 also has a screw slot 47 for a screw 48 which may be threaded into the casing of the indicator 41 as at 49 and thereby serves to clamp the indicator 41 to the bracket 43.

Bracket 43 also has a right-angle shoulder 51 with a sleeve 52 having a bore 53 larger than the spindle 42 and through which the spindle 42 passes. This sleeve 52 is positioned in a clamping block 54 shown in Fig. 6 suitably secured to the arm 11. Clamping block 54 has a slit 56 and a clamping screw 57 which thereby serves to hold the sleeve 52 rigidly in place. However, by loosening screw 57, the bracket 43 and indicator 41 mounted thereon may be rotated within the block 54 to any desired position, at which it may once again be secured by the screw 57, whereby the indicator dial face may be caused to face either the handle 12, as shown in Figs. 1 and 2, or to be in the plane of the instrument, as shown in Fig. 7, or in any other position convenient to the operator, thereby providing a completely rotatable mounting for the indicator itself. This rotation can be effected without change in any calibration, since the sleeve 52 and shoulder 51 can be seated fully against the clamping block 54 in each position of the indicator.

Also mounted on the frame member 13 is a cam 60 in contact with the end of spindle 42, and which, upon movement of the frame member 13 relative to frame member 11, serves to move spindle 42 longitudinally to provide a reading on the indicator 41.

It will be understood that there is not a true linear relationship between the angular displacement of frame member 13 and the separation of caliper tips 34. Rather, the tip separation is essentially the chordal distance of an arc corresponding to the angular displacement of the frame member 13. Accordingly, if there were a direct linear relationship between the angular movement of frame 13 and the linear movement of spindle 42, the instrument would be in considerable error, especially for larger tip separations. Also, a source of error might occur because the lower end of spindle 42 moves in a line displaced from the fulcrum, and hence has varying distances from the fulcrum depending upon its position, that is, depending upon the separation of the caliper tips 34. The cam 61 is so designed as to compensate for these non-linearities and to cause the movement of spindle 42 to be linearly proportioned to the caliper tip separation, so that a conventional dial indicator will then accurately register the true dimension being measured.

By way of example, the ratio of the distance from the fulcrum 14 to each of the caliper arm tips 34 to the distance from that fulcrum to the point of contact of spindle 42 on cam 61 at minimum reading may be 10:1, whereby for each one inch of separation of the caliper arm tips 34, spindle 42 will be reciprocated by $\frac{1}{10}$ inch. This will, of course, be registered on indicator 41, which may be directly calibrated to read in terms of the separation of the caliper tips 34. Since such indicators may read to an accuracy of one ten-thousandth of an inch of travel of spindle 42, the entire instrument may have an accuracy of one-thousandth of an inch, over an extended range, such as between 0 and 4 inches. For accurate and simple reading, it is preferred to use a dial indicator 41 having a pointer which makes a number of full revolutions over its complete range. For example, the pointer may make one complete revolution for a spindle displacement of 0.1 or 0.05 inch, corresponding to 1 or 0.5 inch displacement of the caliper tips. A revolution counter incorporated in the indicator then indicates the number of whole or half inches measured, while the pointer gives the finer indication to the required accuracy.

In setting the zero point of such an instrument, the caliper tips 34 are permitted to touch, giving the minimum reading position of the gage. At this position, the spindle 42 touches cam 60 at a point which is on a radius from the fulcrum, that radius preferably being perpendicular to the axis of spindle 42. This has the important advantage of causing all lateral stress on spindle 42 to be in the same direction over the entire range of the instrument, thereby continuously taking up any lateral play and maintaining accuracy of reading. The clamp screw 48 is then loosened, and indicator 41 is slid along grooves 44 of bracket 43 until the indicator dial reads zero at which point the indicator 41 is clamped to the bracket 43. This adjustment need not be varied when rotating the indicator to face in desired direction, since the shoulder 51 engaging the clamp block 54 keeps the same axial position of indicator 41 no matter how it is rotated.

The caliper gage thus far described and illustrated in Figs. 1–6, is adapted for the measurement of external dimensions but not of internal dimensions. For the purpose of permitting the use of the same instrument for measuring internal dimensions, a pair of caliper arms shown at 61 and 62 in Fig. 7 is provided, which may be substituted for the corresponding arms 25 and 26. These arms 61, 62 are provided with locating holes 28 and fastening holes 32 similar to and in exact registry with those of arms 25, 26 so as to permit direct substitution of arms 61 and 62 for arms 25 and 26. In this way, arms 61 and 62 may be secured to the frame members 11 and 13 for use for internal measurements. At the same time, a thumbpiece 63 is provided, secured to the trigger 33 as by screws 66, one of which may be extended through the trigger 33 to provide a pin to which spring 36 may be secured at one end. A further pin 67 is provided for the other end of spring 36. Therefore, by moving spring 36 from pins 37 and 38 to pins 67 and 66, and by substituting arms 61 and 62 for outside measuring arms 25 and 26, the gage may be converted to an internal measuring gage. The spring 36 now serves to maintain the caliper tips normally open and by pressure on thumbpiece 63 these tips may be brought together to permit the caliper arms and their tips to be inserted within the work to be measured. Upon releasing thumbpiece 63, the spring 36 moves the caliper tips outwardly to engage the work to provide the desired pressure between the tips of the arm suitable for measurements.

In order to avoid the necessity for recalibrating or resetting the indicator 41 each time the gage is converted from internal to external measurement or vice versa, a special relationship is provided between the internal measuring arms 61, 62 and the external measuring arms 25, 26. This is shown in Fig. 8. As indicated above, by way of example, the gage of the present invention may be designed to measure external dimensions between zero and 4 inches. Since in this example the movement of the spindle 42 is $\frac{1}{10}$ the displacement of the tips of arms 25, 26, the indicator 41 will then read from zero to $\frac{4}{10}$ inch. The dial may have a full-revolution range such as $\frac{1}{10}$ inch, with a revolution indicator to show how many revolutions of the indicator pointer have been made. Thus one complete revolution of the main pointer would normally represent $\frac{1}{10}$ inch, corresponding to a one inch separation between the caliper arm tips. At this position of course the spindle 42 is in contact with a single predetermined point of the cam 60.

In substituting the internal measuring caliper arms 61, 62, they are provided with ends 71, 72 having outer tips 73, 74, which contact the work and whose separation indicates the dimension to be measured. These ends 71, 72 are also provided with inner tips 76, 77 which are in contact with one another at the minimum reading of the instrument. In order to avoid recalibration, the present instrument is so arranged that the separation between outer caliper tips 73, 74 when the inner tips 76, 77 are in contact, represents exactly one revolution of the indicator pointer. Under the circumstances illustratively assumed above, this would be one inch, representing the minimum reading. The ends 71, 72 of the caliper arms 61, 62 are then arranged in the following relationship with respect to the frame members 11, 13, by properly locating the fastening holes 28, 32. As a first condition, the radial distance between the caliper arm tips 73, 74 to the fulcrum 14 is chosen to be exactly the same as the radial distance between the tips 34 of caliper arms 25, 26 and the same fulcrum 14. As a second condition, it is so arranged that when the ends 71, 72 of caliper arms 61, 62 are in contact, as illustrated in Fig. 8, the frame members 11, 13 are in exactly the same position as they would be for the external measuring condition if arms 25, 26 were then separated by exactly the same distance as caliper arm tips 73, 74. This is illustrated in Fig. 8, where the dotted lines show the position which caliper arms 25, 26 would have if they were substituted for the arms 61, 62 in the closed position shown in solid lines in Fig. 8, without in any way altering the relationship between the frame members 11 and 13.

The net effect of the foregoing conditions is that, when measuring any internal dimension, the spindle 42 will be in exactly the same relationship to cam 60 as when measuring an external dimension of the same value. The minimum measurable value for internal measurements would be one inch, and the maximum would be the same as for external measurements, giving a range, in the illustrative example given, of from 1 to 4 inches.

It will be understood that thumbpiece 63 is normally retained on the frame member 13 even when using the instrument for external measurements so as to simplify conversion between external and internal measurements, requiring only the substitution of caliper arms and the moving of spring 36.

It will be understood that the foregoing description is intended to be illustrative only and the invention may assume many different forms, being defined by the appended claims.

What is claimed is:

1. A combined internal and external direct-reading caliper gage, comprising a pair of relatively pivotable frame members having a pivot point, a pair of external-measuring caliper arms adapted to be removably secured respectively to said frame members and having respective measuring tips, a dial indicator mounted on one of said frame members, a handle grip on one of said frame members, a trigger member formed on the other of said frame members, a spring, means for mounting said spring between said frame members for normally urging said frame members together, further means for mounting said spring between said frame members for normally urging said frame members apart, a thumbpiece secured to said trigger member, whereby, upon holding said handle grip, said frame members may be selectively urged in either direction against action of said spring either by said thumbpiece or by said trigger member, and a second pair of caliper arms suitable for internal measurements and having respective outwardly extending measuring tips, said second pair of caliper arms being adapted to be removably secured respectively to said frame members with the radial distance between the pivot of said frame members and the tips of said internal-measuring caliper arms when mounted on said frame members being equal to the radial distance between said pivot and the tips of said external-measuring caliper arms when mounted on said frame members, said dial indicator having a pointer which makes more than one complete revolution over the complete range of measurement, and said internal-measuring caliper arms having a minimum separation between their measuring tips equal to one full rotation of said dial indicator pointer, said internal-measuring caliper arms being adapted to be secured to said frame members with said frame members having positions relative to each other at the minimum separation of said internal-measuring caliper arm tips which are the same relative positions which said frame members have when said external-measuring arms are attached thereto and have their measuring tips separated by a multiple of the minimum separation of said internal-measuring arm tips as measured on the dial, whereby said internal- and external-measuring caliper arms may be interchanged without altering the calibration of said indicator.

2. A combined internal and external direct-reading caliper gage, comprising a pair of relatively pivotable frame members having a pivot point, a pair of external-measuring caliper arms adapted to be removably secured respectively to said frame members and having respective measuring tips, a dial indicator mounted on one of said frame members spring means, means for mounting said spring means to urge said frame members together, means for mounting said spring means to urge said members apart, trigger means for urging said frame members in a direction opposing the action of said spring when mounted in either manner, and a second pair of caliper arms suitable for internal measurements and having respective outwardly extending measuring tips, said second pair of caliper arms being adapted to be removably secured respectively to said frame members with the radial distance between the pivot of said frame members and the tips of said internal-measuring caliper arms when mounted on said frame members being equal to the radial distance between said pivot and the tips of said external-measuring caliper arms when mounted on said frame members, said internal-measuring caliper arms being adapted to be secured to said frame members with said frame members having positions relative to each other at the minimum separation of said internal-measuring caliper arm tips which are the same relative positions which said frame members have when said external-measuring arms are attached thereto and have their measuring tips separated by a multiple of the minimum separation of said internal-measuring arm tips as measured on the dial, whereby said internal- and external-measuring caliper arms may be interchanged without altering the calibration of said indicator.

References Cited in the file of this patent

UNITED STATES PATENTS

| 2,514,024 | Bernard | July 4, 1950 |
| 2,581,946 | Duesler | Jan. 8, 1952 |
| 2,698,485 | Johnson | Jan. 4, 1955 |

FOREIGN PATENTS

| 22,232 | Great Britain | Sept. 30, 1909 |
| 602,701 | Great Britain | June 1, 1948 |